US008521018B2

(12) United States Patent
Akiyama (10) Patent No.: US 8,521,018 B2
(45) Date of Patent: Aug. 27, 2013

(54) BUILT-IN FLASH POP-OUT MECHANISM (75) Inventor: Kazuhiro Akiyama, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 13/473,941

(22) Filed: May 17, 2012

(65) Prior Publication Data

US 2012/0294601 A1    Nov. 22, 2012

(30) Foreign Application Priority Data

May 17, 2011  (JP) ................................. 2011-110548

(51) Int. Cl.
    G03B 15/03   (2006.01)
(52) U.S. Cl.
    USPC .......................................................... 396/177
(58) Field of Classification Search
    USPC .......................................................... 396/177
    See application file for complete search history.

(56) References Cited

U.S. PATENT DOCUMENTS

| | | | |
|---|---|---|---|
| 5,761,550 A * | 6/1998 | Kancigor | 396/176 |
| 6,304,728 B1 * | 10/2001 | Bittner | 396/177 |
| 6,999,676 B2 * | 2/2006 | Hsien et al. | 396/177 |
| 8,160,438 B2 * | 4/2012 | Shintani et al. | 396/175 |
| 2011/0052171 A1 * | 3/2011 | Yasuda et al. | 396/176 |

FOREIGN PATENT DOCUMENTS

JP    2009-086226 A    4/2009

\* cited by examiner

*Primary Examiner* — Clayton E LaBalle
*Assistant Examiner* — Noam Reisner
(74) *Attorney, Agent, or Firm* — Greebblum & Bernstein P.L.C.

(57) ABSTRACT

A built-in flash pop-out mechanism comprises a shaft member movable along a first axis; an arm member where one end is pivotally fixed at an end of the shaft member about a second axis; a flash-support member pivotally fixed at the other end of the arm member about a third axis; a first biasing member biasing the shaft member along the first axis; a second biasing member biasing the arm member about the second axis; a third biasing member biasing the flash-support member about the third axis. The built-in flash is extended from a camera body with coplanar motions that pop out the built-in flash to increase its distance from an optical axis. The motions include a translation of the shaft member along the first axis and rotations of the arm member and flash-support member about the second and third axes.

12 Claims, 7 Drawing Sheets

BUILT-IN FLASH POP-OUT MECHANISM

BACKGROUND OF THE INVENTION

1. Field of the Invention

The present invention relates to a pop-up or pop-out mechanism for a built-in flash provided on a camera body.

2. Description of the Related Art

Some cameras are configured with a built-in flash that pops out from the camera body when illuminating a scene requires a flash of light. By positioning the flash as far as possible from the photographing optical axis, vignetting and red-eye effect caused by light emitted from the flash device can be prevented. For example, a pop-up mechanism may include a shaft with the flash on its tip. The shaft is slidable in the vertical direction and biased upward by a spring. When retracting the flash, the shaft is retracted inside the camera body and its position is fixed by an engaging mechanism. When shooting with the flash, a user manipulates a slider knob that releases the engagement, thus the spring pushes up the shaft and the flash pops up from the camera body (as disclosed in Kokai 2009-86226).

SUMMARY OF THE INVENTION

As the size of the camera is reduced, the position of the built-in flash on the camera body gets closer to the photographing optical axis, thus the vignetting effect and the red-eye effect increases. In particular, for a compact interchangeable-lens camera, these effects are substantial when a short focal-length lens is used. Therefore, as for this type of camera, the flash should be moved further from the optical axis. However, as the size of the camera body is reduced, the length of the shaft in the pop-up mechanism is also reduced, thereby the displacement of the flash from the optical axis is insufficient in the prior art.

Accordingly, one aspect of the present invention is to provide a pop-out mechanism for a compact camera that is able to extend a built-in flash relatively far away from the optical axis.

According to the present invention, a built-in flash pop-out mechanism of a camera is provided. The pop-out mechanism comprises a shaft member, an arm member, a flash support member, a first biasing member, a second biasing member and a third biasing member.

The shaft member is linearly movable along a first axis. One end of the arm member is pivotally fixed about a second axis perpendicular to the first axis at a tip end of the shaft member. The flash support member is pivotally fixed about a third axis parallel to the second axis at the other end of the arm member. The first biasing member biases the shaft member along the first axis, the second biasing member biases the arm member about the second axis against the shaft member, and the third biasing member biases the flash support member about the third axis against the arm member. The built-in flash is extended from a camera body with coplanar motions that pop out the built-in flash to increase its distance from an optical axis of a lens. These motions comprise a translation of the shaft member along the first axis by the first biasing member, a rotation of the arm member about the second axis by the second biasing member, and a rotation of the flash support member about the third axis by the third biasing member.

Further, according to the present invention, a camera provided with the above-mentioned built-in flash pop-out mechanism is provided.

Further, according to another aspect of the present invention, a camera provided with a built-in flash mechanism that includes a shaft member, an arm member and a flash support member is provided. The shaft member is linearly movable along a first axis. One end of the arm member is pivotally fixed at a tip end of the shaft member about a second axis that is perpendicular to the first axis. The flash support member is pivotally fixed at the other end of the arm member about a third axis that is parallel to the second axis. The built-in flash being movable between a retracted position and a popped out position, the shaft member, the arm member, the flash support member and each of the axes being moved coplanarly when they are in the process of being retracted or popped out.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with references to the embodiments shown in the drawings.

FIGS. 1-4 are a front elevational view, a top plan view, a right side elevational view and a front perspective view of a compact camera to which a pop-up (or pop-out) mechanism for a built-in flash, such as an embodiment of the present invention, is applied. Incidentally, in FIGS. 1-4, the pop-up mechanism is retracted inside the camera body.

The compact camera of this embodiment may be an interchangeable-lens digital camera. A lens mount 11 for connecting a lens barrel may be provided in the center of the front face of the camera body 10. For example, as shown in the front elevational view and the top plan view, a mode dial 12, an E-dial or a shaft encoder 13 and a release button 14 are provided on the left-hand side of the camera body 10, while a built-in flash unit 15 is provided on the front right-hand side. Further, on the top of the camera body 10 and behind the built-in flash unit 15, a pop-up knob 16 for extending the built-in flash unit 15 is provided. Note that in each of the figures, the camera body 10 is depicted with the lens barrel detached from the lens mount 11. However, in FIGS. 1-3, a dashed line indicates the optical axis L of the lens barrel when it is attached to the lens mount 11.

Figure 9:
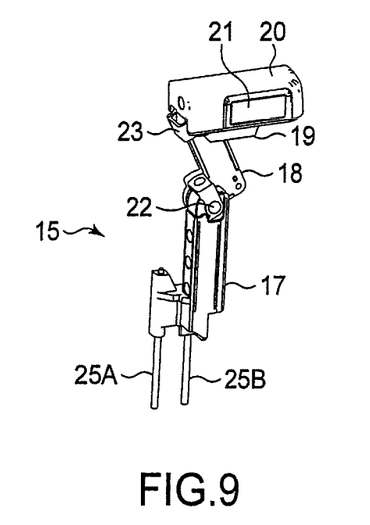
FIG. 9 is a front perspective view of the built-in flash unit in the popped up position.
Figure 10:
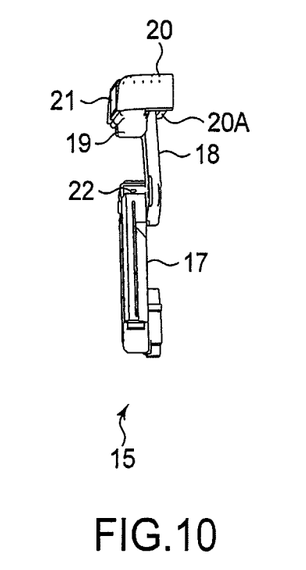
FIG. 10 is a side perspective view of the built-in flash unit in the popped up position.

FIGS. 5-8 are a front elevational view, a top plan view, a right side elevational view and a front perspective view of the camera body 10 when the built-in flash unit 15 is extended in the pop-up position, where FIGS. 5-8 correspond to FIGS. 1-4, respectively. Further, a front perspective view and a side perspective view of the built-in flash unit 15 in the pop-up position are shown in FIG. 9 and FIG. 10.

The pop-up mechanism of the built-in flash unit 15 includes a shaft member 17, an arm member 18 and a flash support member 19. A light source (not shown) of the built-in flash unit 15 is supported by the flash support member 19 and housed inside a flash cover 20. Further, on the front side of the flash cover 20, a window 21 is provided for emitting flashed light.

The shaft member 17 is linearly movable in the vertical direction (a direction of a first axis) in the camera body 10 and biased upward with respect to the camera body 10 by a biasing member, such as a coil spring and the like. The tip of the shaft member 17 is provided with a rotational joint 22 (a second axis) and one end of the arm member 18, which may be formed in a shape of the letter "L", is rotatably connected. Further, the other end of the arm member 18 is provided with a rotational joint 23 (a third axis) that rotatably supports the flash support member 19.

The rotational joint 22 is provided with a rotational biasing member, such as a torsion spring and the like, to bias the arm member 18 to rotate toward the outer side of the camera body 10 with respect to the shaft member 17. A rotational biasing member, such as a torsion spring and the like, is also provided on the rotational joint 23 so that the flash support member 19 is rotationally biased in the direction opposite to the biasing direction of the rotational joint 22. Namely, in FIG. 5, the rotational joint 22 applies a biasing force to the arm member 18 in the clockwise direction and the rotational joint 23 applies a biasing force to the flash support member 19 in the counter-clockwise direction.

The rotational joints 22 and 23 are each provided with a stop mechanism to limit rotation to predetermined ranges so that the rotations of the arm member 18 with respect to the shaft member 17 and the flash support member 17 with respect to the arm member 18, namely those induced by each of the rotational biasing members, are limited to a predetermined angular range. Further, the translation of the shaft member 17 by the biasing member is also limited to a predetermined height by a stop mechanism. Incidentally, in FIGS. 5-10, the translation and rotational motions of all of the members are suspended by their respective stop mechanisms, such that the final state of the pop-up transformation is as illustrated.

Figure 1:
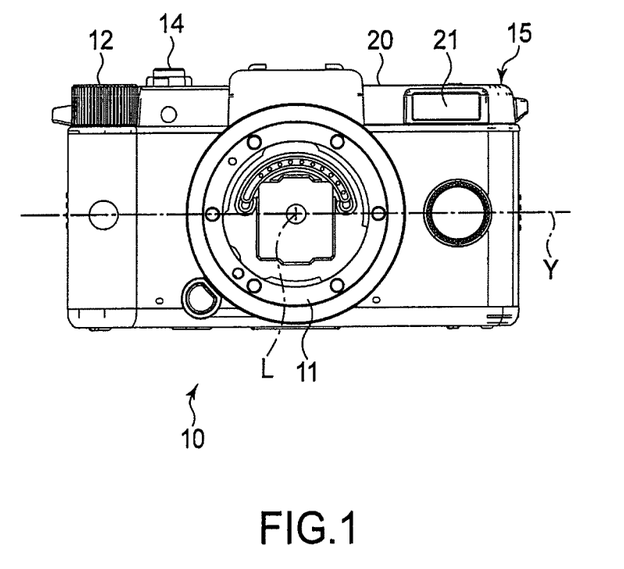
FIG. 1 is a front elevational view of a compact camera when a built-in flash is retracted.
Figure 2:
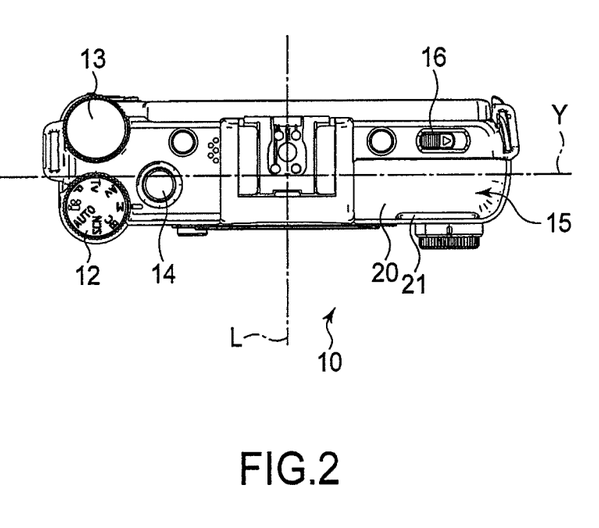
FIG. 2 is a top plan view of the compact camera when the built-in flash is retracted.
Figure 3:
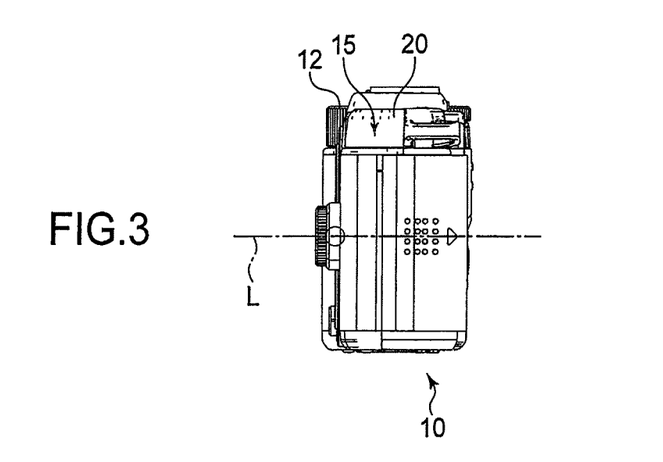
FIG. 3 is a right side elevational view of the compact camera when the built-in flash is retracted.
Figure 4:
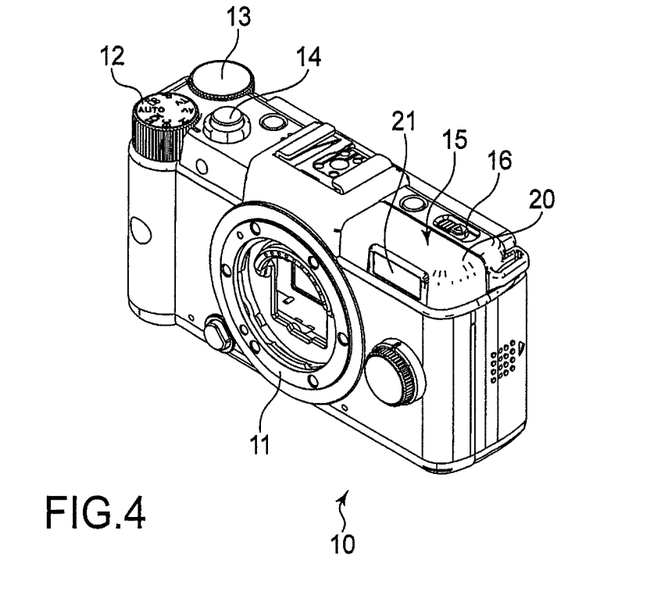
FIG. 4 is a front perspective view of the compact camera when the built-in flash is retracted.
Figure 8:
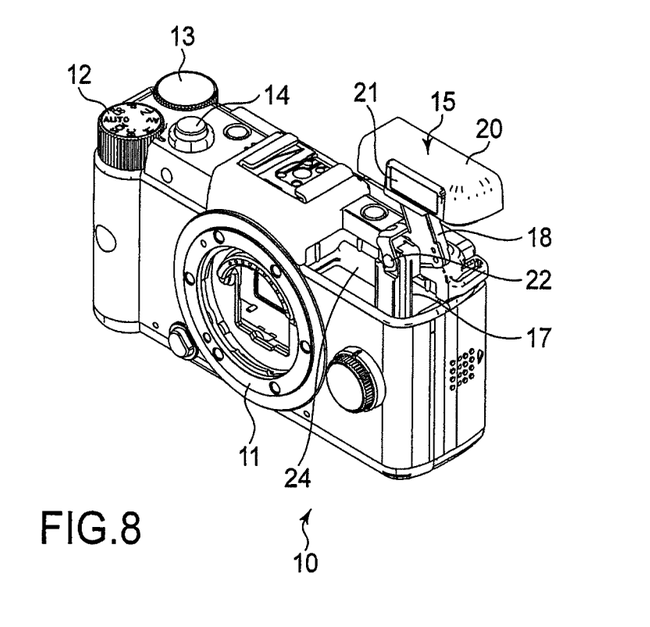
FIG. 8 is a front perspective view of the compact camera when the built-in flash is popped up.

As illustrated in FIG. 8, a recessed flash seat 24, which is a recessed portion corresponding to the flash cover's 20 shape, is formed at a corner determined by the top, front and left side faces of the camera body 10 (the right-hand side in FIG. 8). Namely, when the flash is retracted, the flash cover 20 is received and fitted in the recessed flash seat 24, as shown in FIG. 4, so that the entire body generally forms a rectangular cuboid.

The recessed flash seat 24 is provided with a shaft void where the shaft member 17 is inserted and retracted along the vertical ridgeline defining the front face and the left-side face (on the right-hand side in FIG. 8). Inside the shaft void, a rod-like guide member 25 may be disposed in the vertical direction and the shaft member 17 is slidably engaged with the guide member 25A, as illustrated in FIG. 9.

A spring guide rod 25B that is arranged parallel to the guide member 25A is provided on the shaft member 17. A coil spring (not shown) is disposed about the spring guide rod 25B. Namely, when the shaft member 17 is retracted, the coil spring is compressed and the shaft member 17 is biased upward from the camera body 10 along the guide member 25A. When the shaft member 17 is depressed and the flash cover 20 is seated on the recessed flash seat 24, the position of the flash support member 19 is fixed by a locking mechanism that is disposed between the pop-up knob 16 and the flash cover 20, and thereby the pop-up mechanism is maintained in the retracted position.

Incidentally, the arm member 18 is positioned on the rear side of the flash support member 19 and the shaft member 17, and when the flash is retracted, the arm member 18 is laid side-by-side behind the flash support member 19 and housed inside an arm receiving void 20A provided within the flash cover 20.

By sliding or manipulating the pop-up knob 16, the engagement of the locking mechanism with the flash support member 19, which is maintained in the retracted position shown in FIGS. 1-4, is released. Accordingly, the shaft member 17 is pushed up in direction "A" of FIG. 5, the arm member 18 is rotated in direction "B" with respect to the shaft member 17 and the flash support member 19 is rotated in direction "C" with respect to the arm member 18 by the respective biasing forces applied by each of the biasing members.

Figure 11:
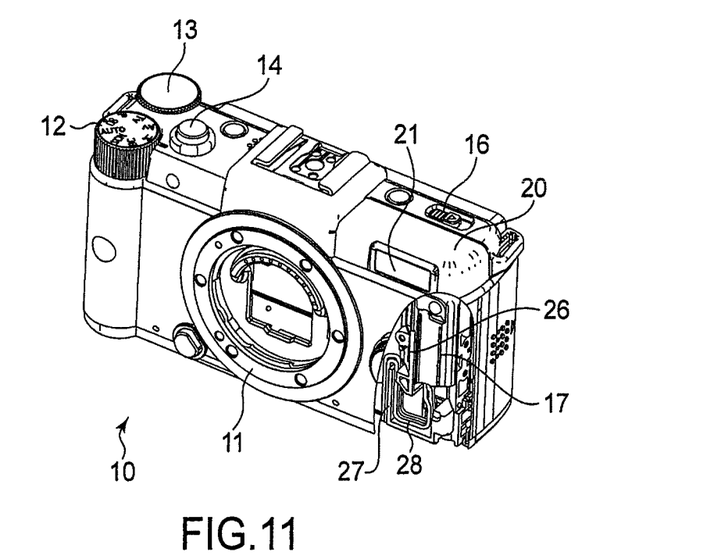
FIG. 11 is a partially cutaway perspective view of the camera body in the retracted position.
Figure 12:
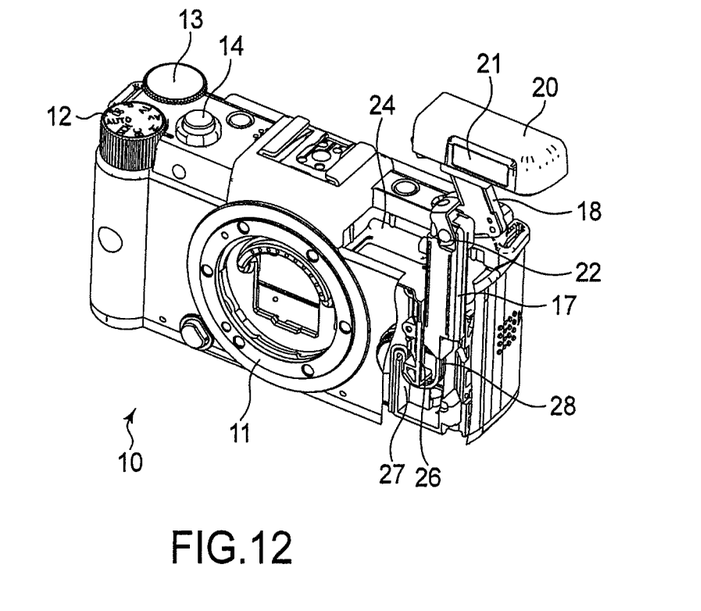
FIG. 12 is a partially cutaway perspective view of the camera body in the popped up position.

Note that FIG. 11 and FIG. 12 are perspective views of the camera body 10 with a part of its housing cut away to illustrate the inside of the shaft void where the shaft member 17 is inserted. FIG. 11 illustrates a situation when the flash is retracted (in the retracted position) and FIG. 12 illustrates a situation when the flash is extended (in the popped up position or popped out position).

The shaft void is separated from the central part of the camera body 10 by partitions 26 and 27. The partition 26 extends downward from the recessed flash seat 24 along a flank of the shaft member 17 and its bottom end reaches to a position slightly apart from the bottom of the housing. On the other hand, the partition 27 is provided at a position closer to the central part of the camera body 10. The partition 27 extends upward from the bottom and parallel to the partition 26 to where its top end reaches a position slightly higher than the bottom end of the partition 26.

Namely, the central part of the camera body 10 and the shaft void are interconnected through a gap formed between the partitions 26 and 27 so that lead wires 28 electrically connecting a power circuit inside the camera body 10 and the flash body (not shown) can be strung through this gap. As shown in the figures, the lead wires 28 are laid along the path defined by the gap between the partitions 26 and 27 to form a shape similar to the letter "N". Further, the wires 28 are inserted inside the shaft member 17 from the bottom end of the shaft member 17 and connected to the flash body (not shown) by passing through the inside of the rotational joint 22, arm member 18, rotational joint 23 and flash support member 19. Note that the arrangement of the lead wires 28 is not restricted to the shape similar to the letter "N" as in the present embodiment. The lead wires 28 may also be laid along a shape similar to the letter "S", "U" or the like, unless the lead wires 28 can be flexibly warped during an axial motion of the shaft member 17.

As illustrated in FIG. 12, the lead wires 28 wired along a shape similar to the letter "N" warp closely along the bottom end of the partition 26 when the flash unit 15 is in the popped up position. On the other hand, when the flash unit 15 is in the retracted position, the shaft member 17 is depressed as shown in FIG. 11 and the lead wires 28 are laid on and warped along the bottom surface of the camera body 10 instead of along the bottom end of the partition 26.

Namely, the positions of the bottom end of the partition 26, the top end of the partition 27 and the length of the lead wires 28 from the top end of the partition 27 to the shaft member 17 may be determined in consideration of the position of the bottom end of the shaft member 17, its displacement and the like; for the lead wires 28 are neither to be stretched in the popped up position nor supplied with excessive slack in the retracted position.

Figure 13:
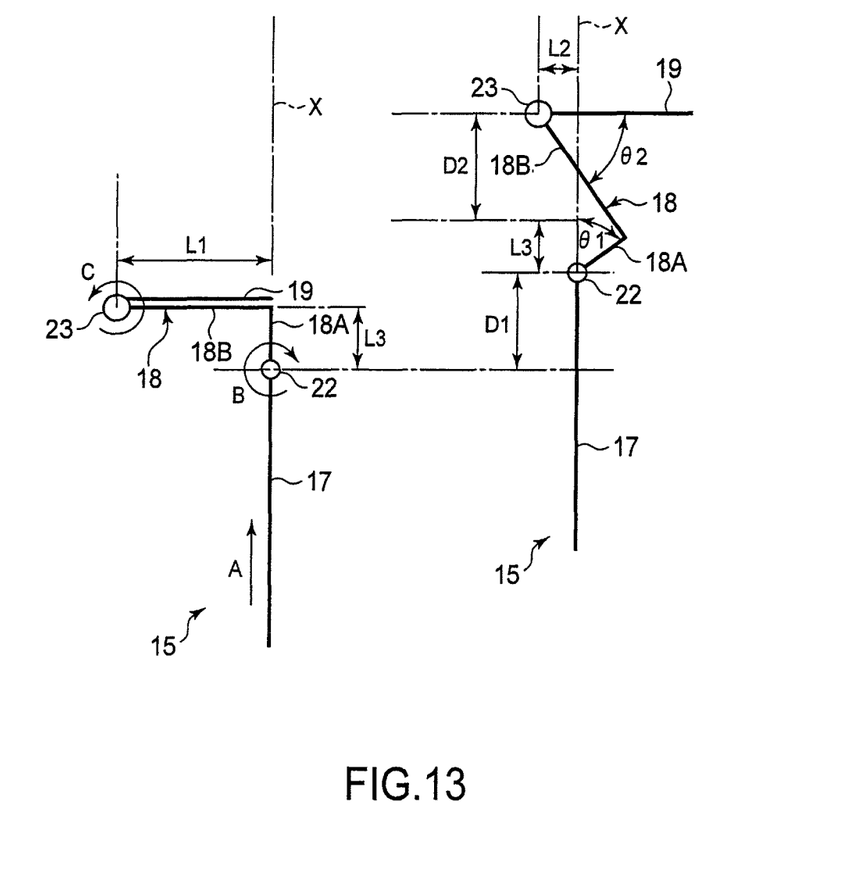
FIG. 13 is a schematic diagram to illustrate the mechanical structures of the built-in flash unit.

Referring to FIG. 13, the behavior and effects of the pop-up mechanism of the present embodiment will be explained. FIG. 13 schematically illustrates mechanical features of the built-in flash unit 15. The arrangement of the members of the built-in flash unit 15 when it is in the retracted position is illustrated on the left side of FIG. 13, and the arrangement in the popped up position is illustrated on the right side. Note that in FIG. 13, the lens is positioned on the left-hand side of the built-in flash unit 15.

In the present embodiment, the arm member 18 may have a shape corresponding to the letter "L". The end of the short arm segment 18A of the arm member 18 is connected to the top end of the shaft member 17 via the rotational joint 22. In the flash-retracted position, the short arm segment 18A is aligned in the axial direction of the shaft member 17 and received inside the shaft void. At the same time, the long arm segment 18B of the arm member 18 is oriented in the lateral direction toward the central area of the camera body 10 and parallel to the Y-axis (see FIGS. 1 and 2) of the camera body 10.

Further, in the flash-retracted position, the flash support member 19 is laterally positioned along the long arm segment 18B. Note that the long arm segment 18B of the arm member 18 in FIG. 13 is illustrated on the upper side of the flash support member 19 for the sake of convenience. In reality, the flash support member 19 is positioned in front of and adjacent to the long arm segment 18B.

Figure 5:
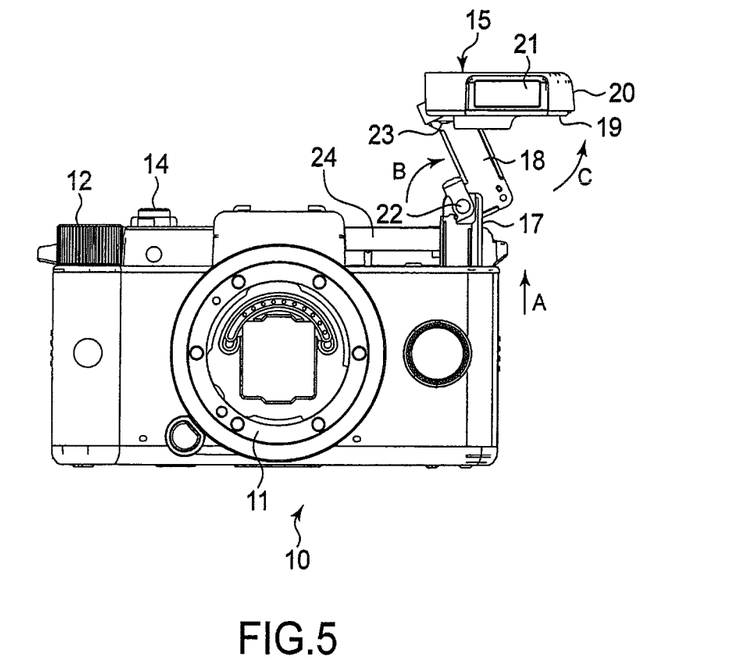
FIG. 5 is a front elevational view of the compact camera when a built-in flash is popped up.
Figure 6:
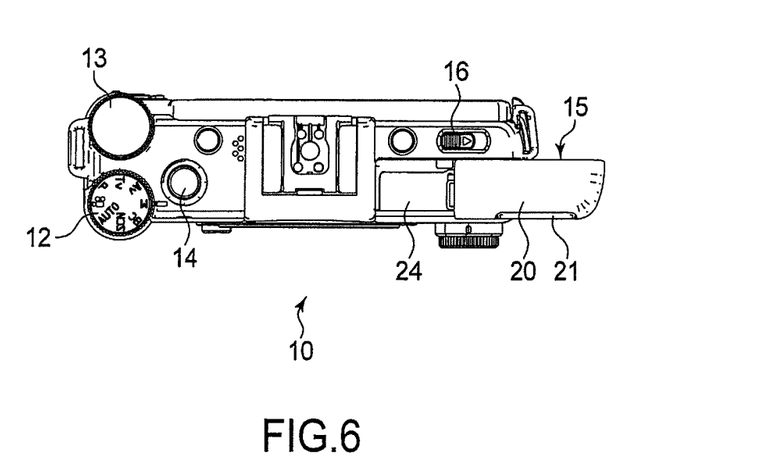
FIG. 6 is a top plan view of the compact camera when the built-in flash is popped up.
Figure 7:
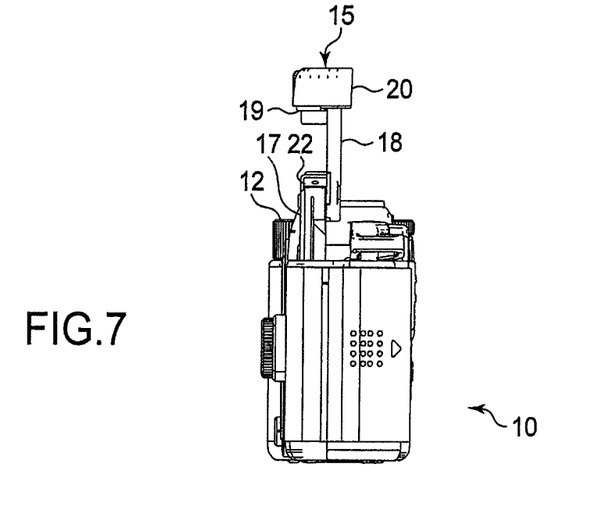
FIG. 7 is a right side elevational view of the compact camera when the built-in flash is popped up.

As explained with reference to FIG. 5, the shaft member 17 is biased upward (the direction "A") along the axis "X" (the first axis), and the arm member 18 is rotationally biased in the clockwise direction (the direction "B") via the rotational joint 22 about the second axis, which is perpendicular to the first axis "X". Further, the flash support member 19 is rotationally biased in the counter-clockwise direction (the direction "C") via the rotational joint 23 about the third axis that is perpendicular to the first axis "X". Incidentally, if the built-in flash mechanism is provided on the side opposite to the present embodiment (the left side in FIG. 1), the directions of the rotational biasing are opposite.

When the engagement for fixing the position of the pop-up mechanism is released by manipulating the pop-up knob 16 (see FIG. 4), the shaft member 17 is slid upward for a distance "D1", the arm member 18 is rotated outward with respect to the camera body 10 at an angle θ1, and the flash support member 19 is rotated at an angle θ2 with respect to the arm member 18. Note that in this pop-up or pop-out operation, the flash body is moved within a plane parallel to the imaging surface of the camera's imaging device and perpendicular to the optical axis "L", see FIGS. 1-3.

In the present embodiment, the angle θ1 is approximately equal to the angle θ2 so that the flash support member 19 is positioned in parallel with the lateral axis "Y" (see FIGS. 1 and 2) of the camera body 10 in the popped up position. However, the value of θ2 maybe selected on the basis of placing the luminous body of the flash as far as possible from the optical axis "L" and at the same time allowing the built-in flash unit 15 to be retracted to the recessed flash seat 24 by only depressing the flash support member 19, so that the value of θ2 may not be approximately equal to θ1. For example, the angle θ2 may be selected within the range from θ1 to θ1+90°. However, when the lateral axis of the luminous body and the lateral axis "Y" of the camera body 10 (i.e., the horizontal line of the imaging device) are not substantially parallel, the vignetting effect may occur in one of four corners of the imaging area depending on an inclination angle of the luminous body. Therefore, the present embodiment, which set θ1=θ2, may be preferable. Note that the limitation of the rotation is performed by a stop mechanism (not shown) provided on the rotational joints 22 and 23.

The rotational angle θ1 is set so that the rotational joint 23 (the third axis) is positioned on the inner side (the left side in the figure) of the rotational joint 22 (the second axis) with respect to the axis (the first axis "X") of the shaft member 17. The position of the rotational joint 23, i.e., the flash body or luminous body, is moved upward at a distance "D2" along the vertical axis by θ1 rotation of the arm member 18 about the rotational joint 22 and also moved along the lateral axis (Y) at a distance (L1−L2) toward the outside.

Here, "L1" denotes the length of the long arm segment 18B of the L-shaped arm member 18 and it corresponds to the distance of the rotational joint 23 from the first axis "X" in the retracted position. Further, "L2" denotes the distance of the rotational joint 23 from the first axis "X" in the popped up position. In the present embodiment, which employs the L-shaped arm member 18, $L2=L1*\cos\theta2-L3*\sin\theta1$ and $D2=L1*\sin\theta2+L3*(\cos\theta1-1)$, where "L3" denotes the length of the short arm segment 18B of the arm member 18.

Therefore, according to the pop-up mechanism of the present embodiment, the flash body or luminous body is moved further away from the lens or the optical axis in addition to the sliding translation of the shaft member 17 along the first axis for the distance "D1". Namely, the flash body is displaced for the additional distance "D2" in the vertical direction and the additional distance (L1−L2) in the lateral direction by the rotational movement of the arm member 18. Thereby, the built-in flash can be further displaced away from the optical axis of the lens and a vignetting effect and red-eye effect can be effectively prevented.

Further, in order to retract the built-in flash in the popped up position, a user merely depresses the flash cover 20 (see FIGS. 5 and 8) toward the recessed flash seat 24. When the flash cover 20 is depressed, the arm member 18 is rotated in the counter-clockwise direction against the rotational biasing force of the rotational joint 22 and laid down to the left in FIG. 13 to be settled in the retracted position, which is illustrated on the left side of FIG. 13. This movement may be obtained by positioning the rotational joint 23 on the side closer to the center of the camera body 10 than the rotational joint 22, such as on the left side of the first axis "X" in FIG. 13.

Further, the pop-up mechanism of the present embodiment is configured so that when the built-in flash unit 15 is depressed by the user, the arm member 18 and the flash support member 19 are first folded to turn the long arm segment 18B of the arm member 18 sideways before the shaft member 17 is depressed. Thereby, the strength of the rotational biasing forces of the rotational joints 22 and 23 and the upward biasing force applied to the shaft member 17 are set accordingly for each of the members to move in the above-mentioned order. Namely, in the present embodiment, the strength of the upward biasing force of the shaft member 17 is set to be the strongest among them. Note that frictional resistance or other means may also control the above-mentioned order.

As described above, according to the pop-up mechanism of the present embodiment, while maintaining a compact retracted size the flash body in the popped up position can be moved further away from the retracted position than what the pop-up mechanism of prior art was capable of using only one of a rotational or translational movement. Thereby, a vignetting effect and red-eye effect can be effectively prevented. In particular, the pop-up mechanism of the present embodiment is useful for a compact interchangeable-lens camera of which space is limited and to which a lens with a short focal length may be mounted.

Further, the pop-up mechanism of the present embodiment moves the flash body in a plane parallel to the imaging surface of the imaging device so that the light source can be efficiently moved away from the optical axis of the lens. Further, since the arm member is positioned on the rear side of the flash support member and the shaft member, in other words behind the flashed-light emitting surface, the dimension of the built-in flash unit in the front-to-back direction is reduced. Moreover, when the arm member and the flash support member are folded, the retracted size of the unit is further reduced by laying the arm member side-by-side adjacently behind the flash support member.

In the present embodiment, the built-in flash unit can easily be moved to the retracted position by a user merely depressing the built-in flash unit. This is due to the arrangement of the rotational joints on both ends of the arm member in the popped up position, namely, the upper rotational joint being positioned relatively closer to the central side than the lower rotational joint. Further, the built-in flash is retracted more smoothly since the pop-up mechanism is configured to have the flash support member and the arm member folded first before the shaft member is depressed.

Although the shaft member of the present embodiment is slid or extended upward, the shaft member may also be extended in any direction if it can be generally regarded as included in a plane perpendicular to the optical axis. Further, as an example, the present embodiment is explained for a compact interchangeable-lens camera; however, the pop-up mechanism of the present embodiment can also be applied to any type of camera. In the present embodiment, the arm member has a shape of the letter "L", as an example; however, the arm member can also have a shape similar to the letters "I", "Z" and so on.

Incidentally, the built-in flash may be configured to flash in either the retracted position or the popped up position. Further, the order of movements of the members in the pop-up motion is not restricted to the present embodiment and it may be adjusted by controlling a biasing force or providing frictional resistance.

In the present embodiment, the rotational biasing forces for each of the rotational joints (about the second and third axes) are opposite to one another. However, these rotational directions may also be the same. Further, the position of the flash in the popped up position can be made more distant from the retracted position by employing more arm members or linking components. For example, arm members having an "L" shape and a reversed "L" shape may be alternately linked together to configure the pop-up mechanism. However, from the aspect of reducing the size, the number of arm members may be one, as in the present embodiment.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2011-110548 (filed on May 17, 2011), which is expressly incorporated herein, by reference, in its entirety.

The invention claimed is:

1. A built-in flash pop-out mechanism of a camera, comprising:
a shaft member linearly movable along a first axis;
an arm member where one end is pivotally fixed at a tip end of the shaft member about a second axis that is perpendicular to the first axis;
a flash support member that is pivotally fixed at the other end of the arm member about a third axis that is parallel to the second axis;
a first biasing member biasing the shaft member along the first axis;
a second biasing member biasing the arm member about the second axis against the shaft member;
a third biasing member biasing the flash support member about the third axis against the arm member; and
the built-in flash being extended from a camera body with coplanar motions that pop out the built-in flash to increase its distance from an optical axis of a lens, the motions comprising a translation of the shaft member along the first axis by the first biasing member, a rotation of the arm member about the second axis by the second biasing member and a rotation of the flash support member about the third axis by the third biasing member.

2. The built-in flash pop-out mechanism as in claim 1, wherein the flash support member is translated along the first axis to increase its distance from the optical axis and rotated to further distance the flash support member from the optical axis.

3. The built-in flash pop-out mechanism as in claim 1, wherein the third axis is positioned closer to the interior of the camera body than the second axis with respect to the first axis when the built-in flash is in a popped out position.

4. The built-in flash pop-out mechanism as in claim 1, wherein the biasing forces of the first, second and third biasing members are selected so that the flash support member and the arm member are rotated about the third and second axes before the shaft member is moved toward the inside of the camera body along the first axis, when the flash support member is depressed in a direction along the first axis toward the camera body from a popped out position.

5. The built-in flash pop-out mechanism as in claim 1, wherein the flash support member is moved in a plane parallel to an imaging surface of an imaging device.

6. The built-in flash pop-out mechanism as in claim 1, wherein the arm member is disposed behind the flash support member.

7. The built-in flash pop-out mechanism as in claim 1, wherein the arm member can be retracted inside a flash cover.

8. The built-in flash pop-out mechanism as in claim 1, wherein the shaft member is disposed proximate to an edge of the camera body.

9. The built-in flash pop-out mechanism as in claim 1, wherein the directions of the rotational biasing forces about the second and third axes are opposite to each other.

10. The built-in flash pop-out mechanism as in claim 1, wherein a lateral axis of a flash body provided on the flash support member is parallel to a horizontal edge of an imaging device.

11. A camera comprising:
a pop-out mechanism for extending a built-in flash; the pop-out mechanism comprising:
a shaft member linearly movable along a first axis;
an arm member where one end is pivotally fixed at a tip end of the shaft member about a second axis that is perpendicular to the first axis;
a flash support member that is pivotally fixed at the other end of the arm member about a third axis that is parallel to the second axis;
a first biasing member biasing the shaft member along the first axis;
a second biasing member biasing the arm member about the second axis against the shaft member;
a third biasing member biasing the flash support member about the third axis against the arm member; and
the built-in flash being extended from a camera body with coplanar motions that pop out the built-in flash to increase its distance from an optical axis of a lens, the motions comprising a translation of the shaft member along the first axis by the first biasing member, a rotation of the arm member about the second axis by the second biasing member and a rotation of the flash support member about the third axis by the third biasing member.

12. A camera comprising:
a built-in flash mechanism comprising:
a shaft member linearly movable along a first axis;
an arm member where one end is pivotally fixed at a tip end of the shaft member about a second axis that is perpendicular to the first axis;
a flash support member that is pivotally fixed at the other end of the arm member about a third axis that is parallel to the second axis; and
the built-in flash being movable between a retracted position and a popped out position, the shaft member, the arm member, the flash support member and each of the axes being moved coplanarly when they in the process of being retracted or popped out.

* * * * *